(12) United States Patent
Medeiros Destro et al.

(10) Patent No.: US 10,956,416 B2
(45) Date of Patent: Mar. 23, 2021

(54) DATA SCHEMA DISCOVERY WITH QUERY OPTIMIZATION

(71) Applicant: INTERNATIONAL BUSINESS MACHINES CORPORATION, Armonk, NY (US)

(72) Inventors: Juliana Medeiros Destro, Indaiatuba (BR); Eduardo Luiz Lopes, São Paulo (BR); Helio Pinheiro E Mota, Ridgefield, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 190 days.

(21) Appl. No.: 16/299,759

(22) Filed: Mar. 12, 2019

(65) Prior Publication Data

US 2020/0293530 A1 Sep. 17, 2020

(51) Int. Cl.
*G06F 16/21* (2019.01)
*G06F 16/2453* (2019.01)

(52) U.S. Cl.
CPC ...... *G06F 16/24535* (2019.01); *G06F 16/213* (2019.01)

(58) Field of Classification Search
CPC .................. G06F 16/24535; G06F 16/213
See application file for complete search history.

(56) References Cited

U.S. PATENT DOCUMENTS

| | | | |
|---|---|---|---|
| 5,873,080 A * | 2/1999 | Coden ................... | G06F 16/951 |
| 9,773,029 B2 | 9/2017 | Sachin | |
| 10,025,599 B1 | 7/2018 | Goodson et al. | |
| 2006/0112142 A1* | 5/2006 | Sako ................... | G06F 16/532 |
| 2007/0185868 A1* | 8/2007 | Roth ................... | G06F 16/80 |
| 2009/0248652 A1* | 10/2009 | Iwayama ............ | G06F 16/3341 |
| 2010/0036815 A1* | 2/2010 | Tago ................... | G06F 16/8373 |
| | | | 707/748 |
| 2013/0238595 A1 | 9/2013 | Weissman et al. | |
| 2015/0317335 A1 | 11/2015 | Limei et al. | |
| 2015/0370834 A1* | 12/2015 | Smith ................. | G06F 16/3338 |
| | | | 707/706 |
| 2016/0224594 A1* | 8/2016 | Chow ................. | G06F 16/2237 |
| 2017/0193016 A1 | 7/2017 | Kulkarni | |
| 2017/0220606 A1 | 8/2017 | Zheng et al. | |
| 2017/0286532 A1* | 10/2017 | Horowitz ................ | G06F 16/34 |
| 2018/0095952 A1* | 4/2018 | Rehal ................... | G06F 16/213 |

(Continued)

FOREIGN PATENT DOCUMENTS

CN 105095237 B 11/2015

OTHER PUBLICATIONS

"Managing Schema Evolution in NoSQL Data Stores" Stefanie Scherzinger, Meike Klettke, Uta Storl Aug. 2, 2013.

(Continued)

*Primary Examiner* — Jorge A Casanova
(74) *Attorney, Agent, or Firm* — Griffiths & Seaton PLLC

(57) ABSTRACT

Embodiments for implementing schema discovery and query optimization by a processor. A schema may be created from one or more histograms of one or more keys and data types of a database and capable of being adapted and recalculated. One or more queries may be assembled according to the schema. One or more indexes and views may be suggested according to the one or more queries and the schema.

9 Claims, 10 Drawing Sheets

(56) References Cited

U.S. PATENT DOCUMENTS

2018/0293276 A1* 10/2018 Bae .................... G06F 16/258
2018/0365306 A1* 12/2018 Parikh ................ G06F 16/213
2019/0065569 A1*  2/2019 Boutros .............. G06F 16/212

OTHER PUBLICATIONS

"Inferring Versioned Schemas From NoSQL Databases and Its Applications" Severino Feliciano Morales, and Jesus Garcia Molina Dec. 8, 2015.

* cited by examiner

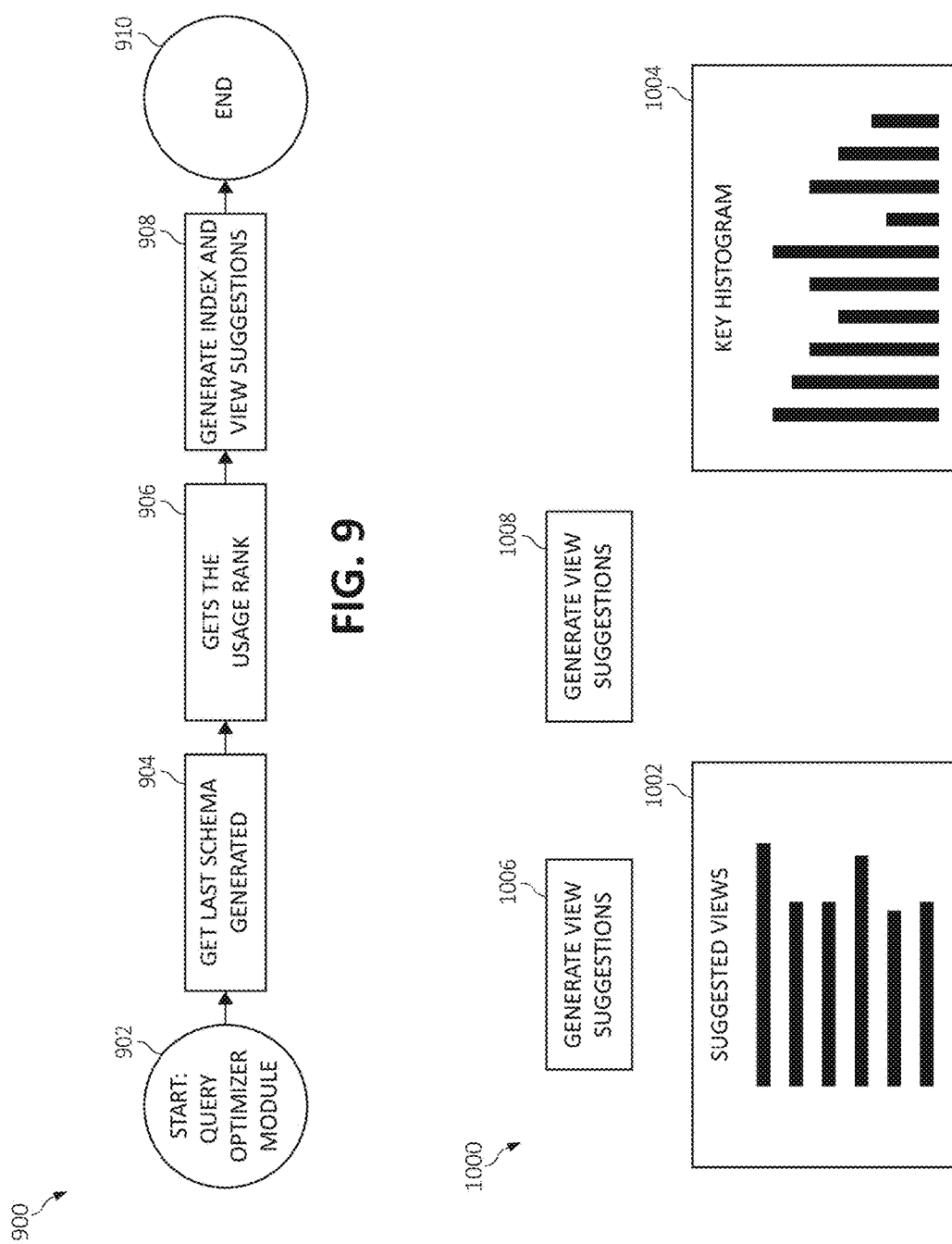

DATA SCHEMA DISCOVERY WITH QUERY OPTIMIZATION

BACKGROUND OF THE INVENTION

Field of the Invention

The present invention relates in general to computing systems, and more particularly, to various embodiments for implementing data schema discovery and query optimization by a processor.

Description of the Related Art

Computing systems may be found in the workplace, at home, or at school. Due to the recent advancement of information technology and the growing popularity of the Internet, a wide variety of computer systems have been used in machine learning. Processing devices, with the advent and further miniaturization of integrated circuits, have made it possible to be integrated into a wide variety of devices. In recent years, both software and hardware technologies have experienced amazing advancement. With the new technology, more and more functions are added, and greater convenience is provided for use with these computing systems.

SUMMARY OF THE INVENTION

Various embodiments for implementing schema discovery and query optimization using one or more processors are provided. In one embodiment, by way of example only, a method for implementing schema discovery and query optimization, again by a processor, is provided. A schema may be created from one or more histograms of one or more keys and data types of a database and capable of being adapted and recalculated. One or more queries may be assembled according to a schema. One or more indexes and views may be suggested according to the one or more queries and the database schema.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 9 is an additional block diagram depicting optimization of a query using a data schema in accordance with aspects of the present invention;

FIG. 10 is an additional block diagram depicting an exemplary user interface with suggestion and view creation functionality in accordance with aspects of the present invention.

DETAILED DESCRIPTION OF THE DRAWINGS

Figure 1:
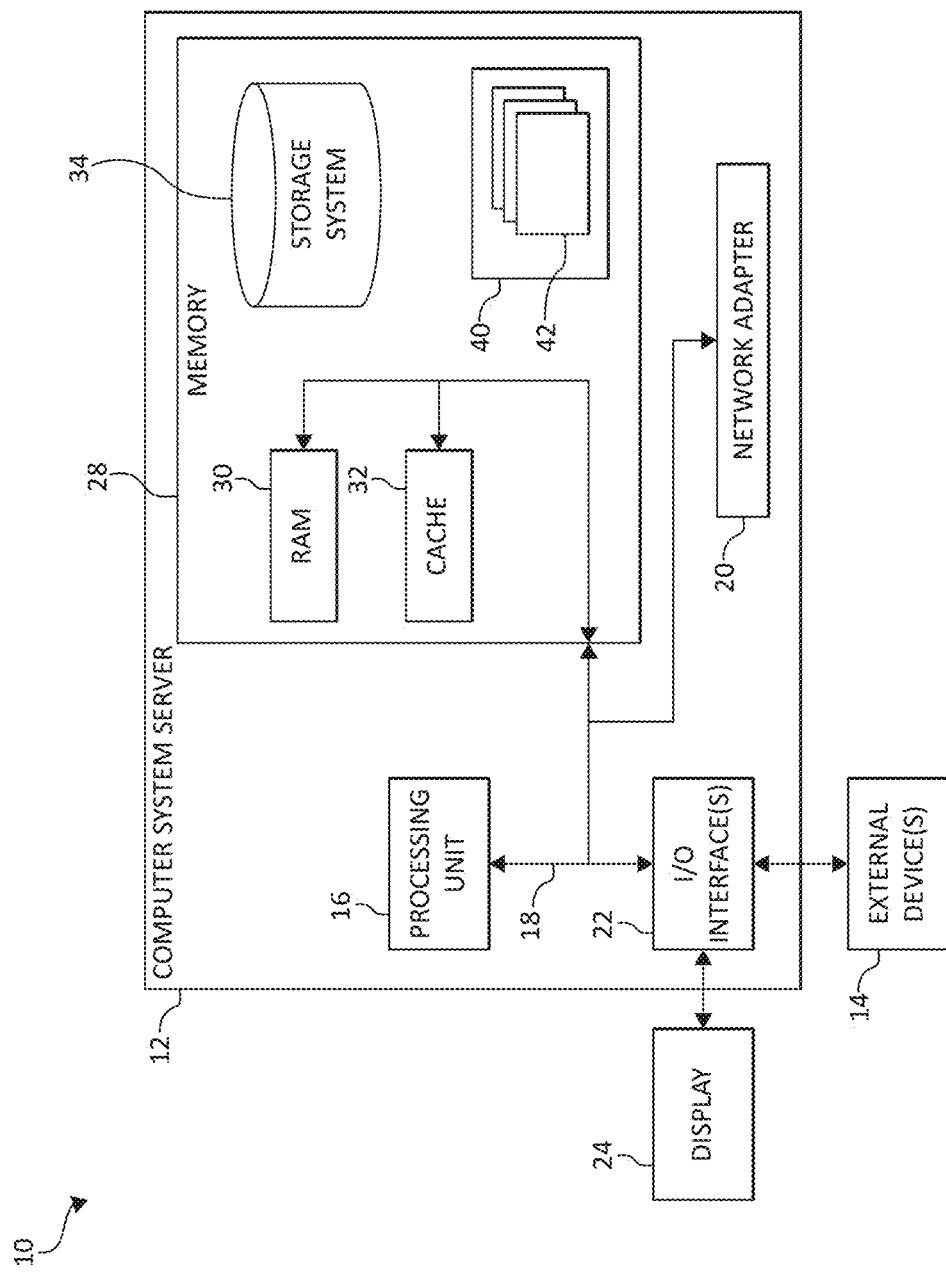
FIG. 1 is a block diagram depicting an exemplary computing node according to an embodiment of the present invention.

With the increased use of computing system, databases play an important role in computing systems for the management, storage, and delivery of data. Non-relational databases are characterized by self-organization, self-management, low cost, high scalability, high concurrency, simple query relation and so on. Specifically, a table in a relational database stores a formatted data structure. The composition of each entry field should be identical and, if not, the relational database still allocates all fields to each entry because every entry needs all fields. Hence, such a structure is a factor behind the performance bottleneck of relational databases. Unlike a relational database, a non-relational database performs storage in the form of key/value pairs, its structure is not fixed, and each entry may have distinct fields and add some own key/value pairs according to needs.

Thus, given the various types and sources of data, the type of data format such as, for example, a fixed data structure, may not always be known or predicted. For example, when using a Not-only-Structured-Query-Language ("NoSQL") non-relational database, there is no fixed schema, increasing the difficulty of creating views and queries. Currently, a NoSQL database may be designed with a fixed schema, but such current technology does not guarantee that the data will always follow the proposed schema. However, for data that is existing in a user's database, a manual inspection is required to understand the data/data structure and infer the schema. Thus, as data changes over time, current technology does not allow for a live schema. In one aspect, a schema may be a structured representation of data that may be static. The live schema is a schema that may be dynamically created and continuously updated. A query may be generated, however, but the fields must be manually added by the user. In order to solve these challenges, the present invention provides a solution that may infer a data structure from the data as a live schema that adapts itself as new data arrives and discovers the schema based on the data while using the discovered schema to automatically build queries and views.

Accordingly, the present invention provides for 1) discovering a schema, based on the structure of the existing data, 2) creating a schema able to be adapted and recalculated at any time, 3) building a query using a prefix notation such as, for example, a polish notation, to assemble queries, and/or 4) optimizing a query, based on the schema discovery and a most used queries that suggests and creates a set of indexes and views. The mechanism of the illustrated embodiments combines a live schema discovery operation with a query optimization operation, that unites a known mathematical notation and a recommendation of indexes and views specific to this data structure and based on usage.

In an additional aspect, the present invention provides for implementing schema discovery and query optimization. A schema may be created from one or more histograms of one or more keys and data types of a database and capable of being adapted and recalculated. One or more queries may be assembled according to a schema. One or more indexes and views may be suggested according to the one or more queries and the database schema.

In an additional aspect, mechanisms of the illustrated embodiments create and/or infer a schema associated with data modeled using other than tabular relations. In response to receiving extracted keys from data and type(s) of data, including the types of string and array from the data, the present invention may generate a histogram for the extracted keys and a histogram for the types of data type(s) of data. The histograms may be stored in a metadata repository. The present invention may generate the schema that may include the extracted keys and respective types of data. The schema may be stored in the metadata repository. The present invention may receive an input of a query using a prefix notation. The present invention may reverse the prefix notation of the query, by the query builder of the computer, prior to processing. The present invention may process the query in reversed prefix notation by translating the query into a query JavaScript Object Notation (JSON) Object. The present invention may add keys used in the query to a usage rank such that a number of occurrences of a query is counted and sorted in descendant order. That is, the added keys are used to calculate the usage of a specific key and suggest views and/or indexes to optimize a data that may be associated with a user (e.g., a user's database). The present invention may return the query JSON Object, by the query builder of the computer to the metadata repository. In response to receiving a latest schema generated, the types of data type(s) and the usage rank from the metadata repository, the present invention may generate a set of suggested views and a set of indexes for common types, including fields containing date and fields with common keywords including keywords of status, identifier and name. That is, the present invention may provide and/or return a set of view suggestions and/or a set of suggested indexes.

As used herein, a schema may be a collection of named objects; the schema provides a way to group those objects logically. A schema may also be a name qualifier; the schema provides a way to use the same natural name for several objects, and to prevent ambiguous references to those objects. A schema may enable multiple applications to store data in a single database without encountering namespace collisions. The schema may contain tables, views, nicknames, triggers, functions, packages, and other objects. A schema may be itself a database object. The term "unstructured data" may include, for example, images, texts, or time series data. The term "structured data" may refer to data represented by column features such as, for example, in relational databases.

It should be noted that one or more calculations may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment and/or computing systems associated with one or more vehicles. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities, but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
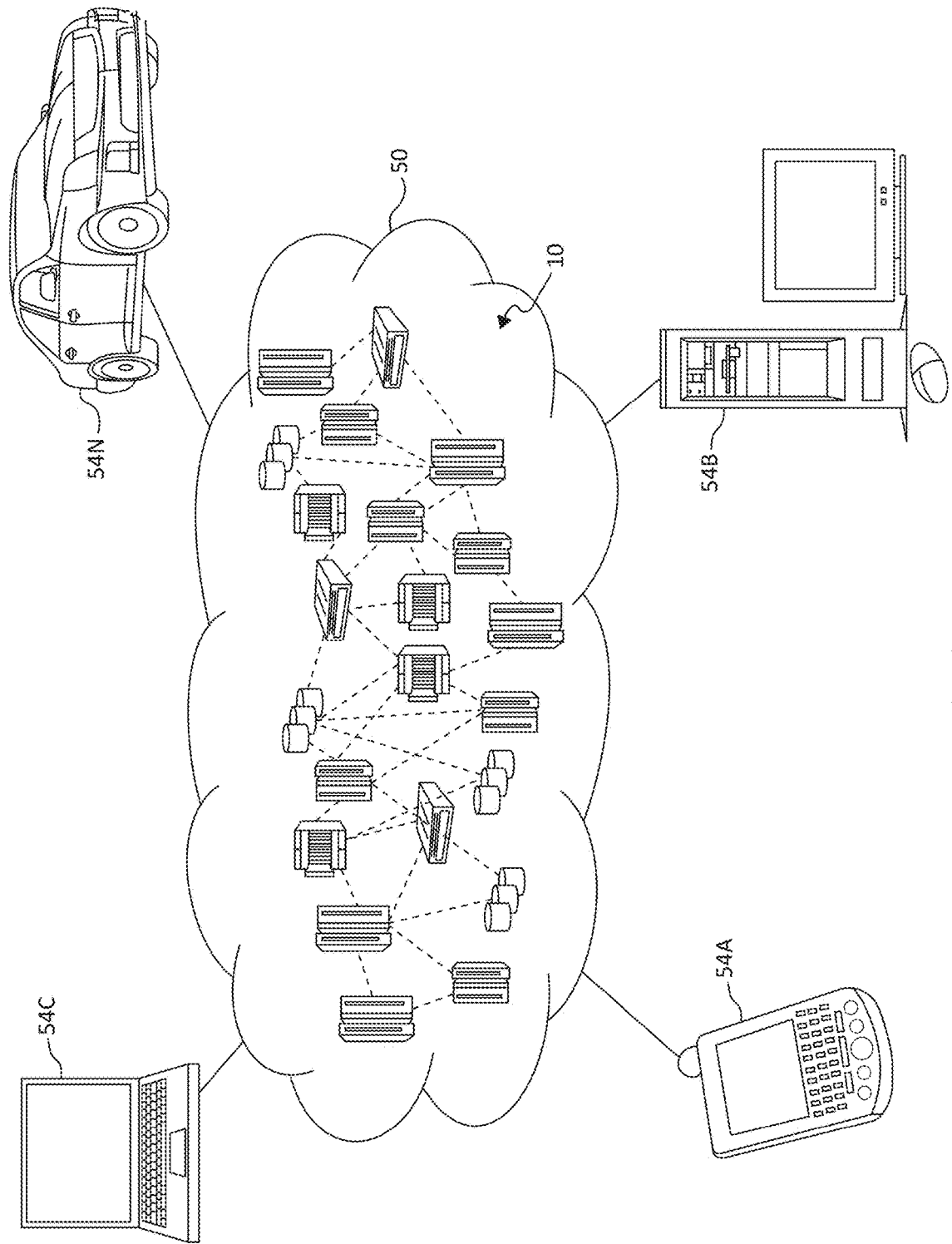
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
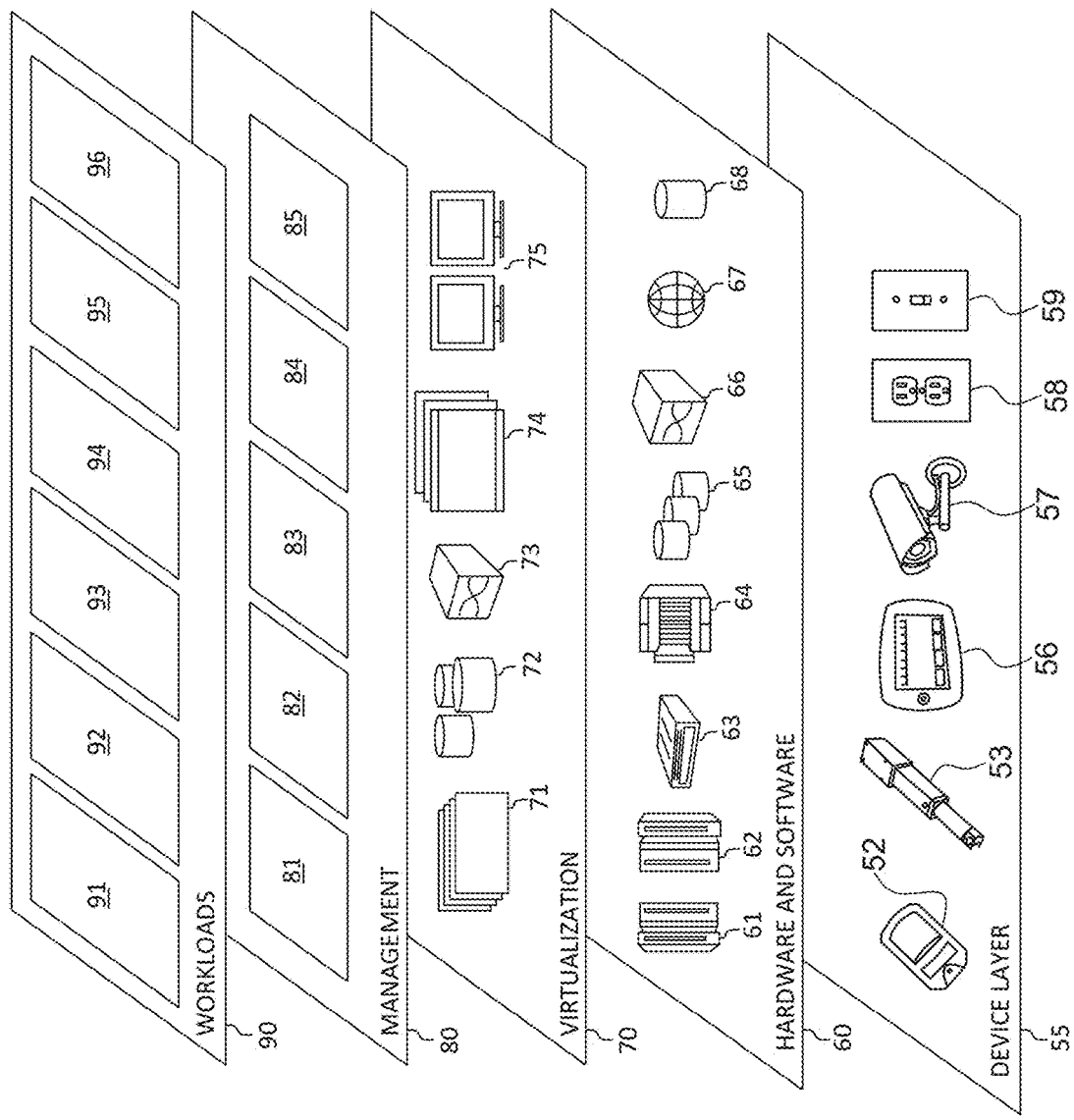
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various automatic data preprocessing workloads and functions 96. In addition, schema discovery and query optimization workloads and functions 96 may include such operations as data analytics, data analysis, and as will be further described, notification functionality. One of ordinary skill in the art will appreciate that the schema discovery and query optimization workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
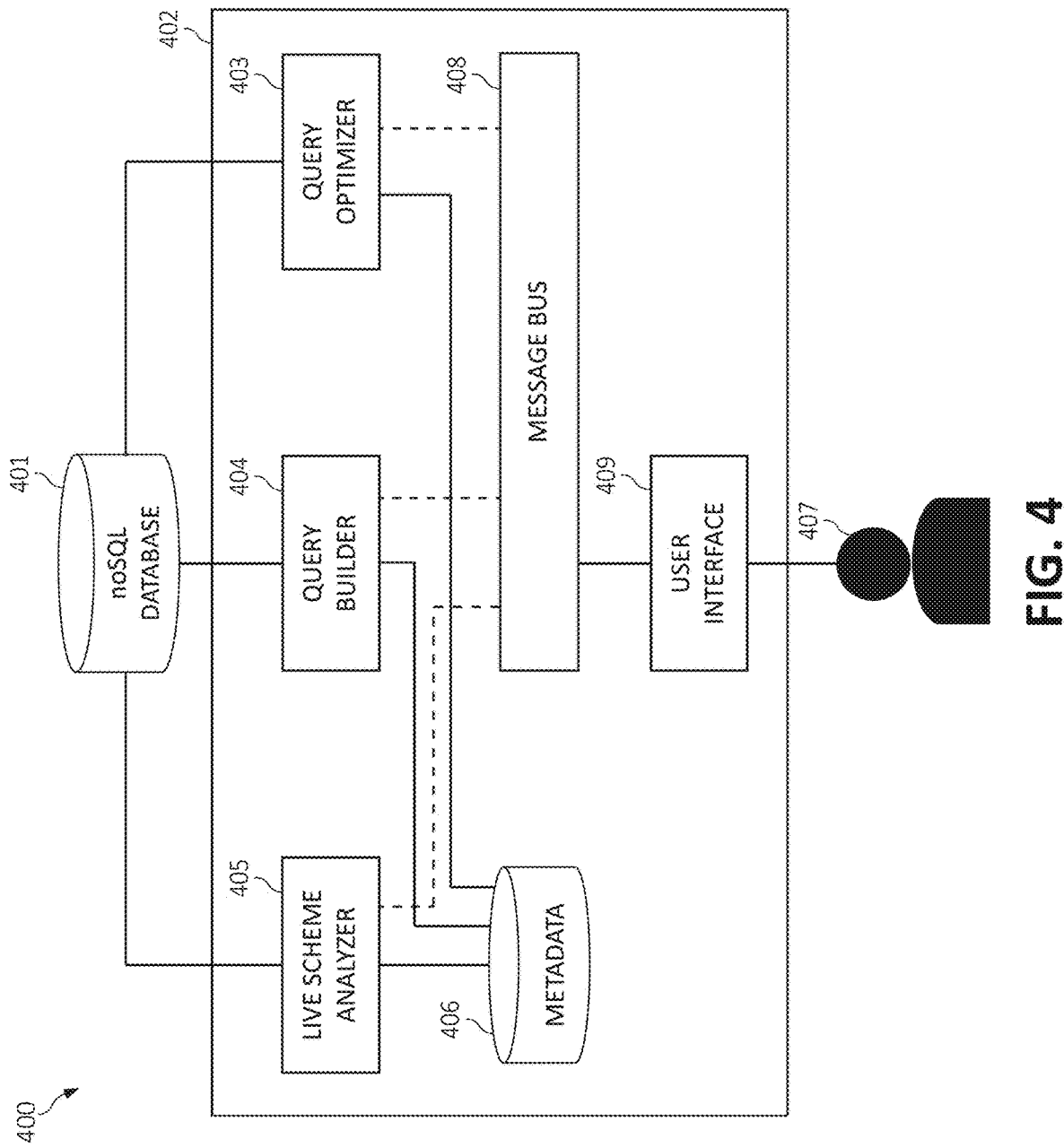
FIG. 4 is an additional block diagram depicting various user computing components functioning in accordance with aspects of the present invention.

Turning now to FIG. 4, a block diagram depicting exemplary functional components 400 according to various mechanisms of the illustrated embodiments is shown. In one aspect, one or more of the components, modules, services, applications, and/or functions described in FIGS. 1-3 may be used in FIG. 4. FIG. 4 illustrates schema discovery and query optimization workloads and functions in a computing environment, such as a computing environment 400, according to an example of the present technology. As will be seen, many of the functional blocks may also be considered "modules" or "components" of functionality, in the same descriptive sense as has been previously described in FIGS. 1-3. With the foregoing in mind, the module/component blocks 400 may also be incorporated into various hardware and software components of a system for automatic data preprocessing in accordance with the present invention. Many of the functional blocks 400 may execute as background processes on various components, either in distributed computing components, or on the user device, or elsewhere.

The computing environment 400 may include a system package 402 and a NoSQL database 401, each of which may be in communication with each other. The system package 402 may be a system that includes a query optimizer 403, a query builder 404, a live schema analyzer 405, a metadata store 406, a message bus 408, and user interface 409.

The NoSQL database 401 may be a database for which queries are required to be build and optimized. The query optimizer 403 may be capable of consuming metadata that represents the schema of the NoSQL database 401, and suggest one or more query optimizations such as, for example, index to user 407 via the user interface 409. The query optimizer 403 may be responsible to suggest one or more views and indexes based on the metadata generated from previous modules and create the views and indexes selected by user 407.

The query builder 404 may enables the user 407 to visually inspect an inferred scheme from the NoSQL database 401. The query builder 404 may generate/build one or more queries using a prefix notation such as, for example, a reverse polish notation. That is, the query builder 404 may responsible to aid the user 407 to generate a JavaScript Object Notation (JSON) query using the live schema information obtained from the live schema analyzer 405 and stored on the metadata store 406. The query builder 404 may create a usage rank to be used by the query optimizer 403 and stores the usage rank on the metadata store 406.

The live schema analyzer 405 may inquire a target database such as, for example, the NoSQL database 401, analyze data in the NoSQL database 401, and/or infer one or more patterns from the data in the NoSQL database 401 to build an inferred schema. The inferred schema may be communicated to user 407 via the user interface 409. The live schema analyzer 405 may leverage one or more operations such as, for example, data type identification, data histograms, and categorical analysis. The live schema analyzer 405 may be responsible to access the NoSQL database 401 and generate a histogram of the keys and data types to create the schema based on data and stored on the metadata store 406.

The metadata store 406 may store data relating to the NoSQL database 401 that is being analyzed by the live schema analyzer 405. The message bus 108 may receive one or more requests via user interface 409 and communicate (e.g., asynchronously) with one or more components of the system package 402.

Figure 5:
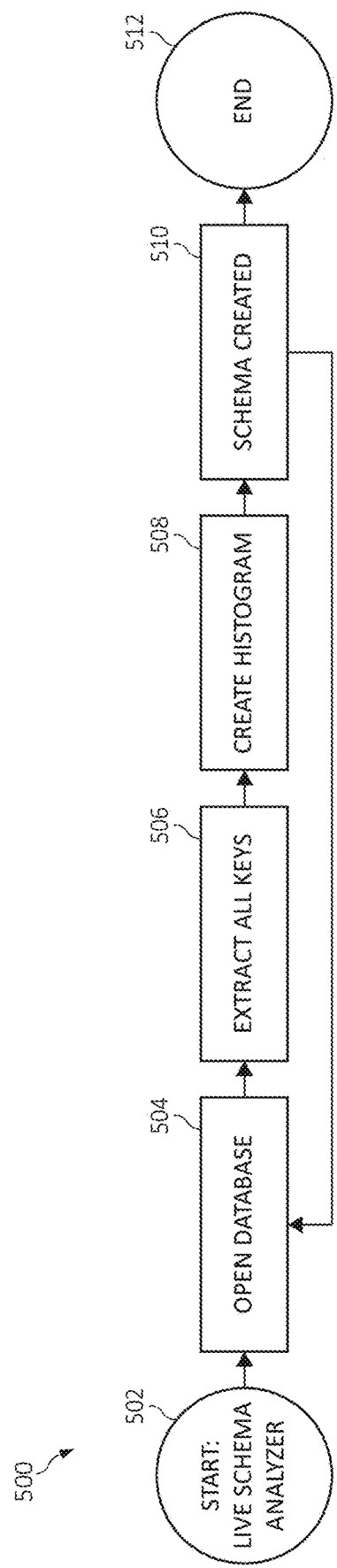
FIG. 5 is an additional block diagram depicting creation of a data schema in accordance with aspects of the present invention.

FIG. 5 is an additional block diagram depicting creation of a data schema. In one aspect, one or more of the components, modules, services, applications, and/or functions described in FIGS. 1-4 may be used in FIGS. 4 and 5. Repetitive description of like elements, components, modules, services, applications, and/or functions employed in other embodiments described herein (e.g., FIGS. 1-4) is omitted for sake of brevity.

For example, the live schema analyzer 405 of FIG. 4 and/or the computer system/server 12 of FIG. 1, incorporating processing unit 16, may be used to perform various computational, data processing and other functionality described in FIG. 5. It should be noted that, as shown, the various blocks of functionality are depicted with arrows designating the blocks' 500 relationships with each other and to show process flow. As will be seen, many of the functional blocks may also be considered "modules" or "components" of functionality.

Starting in block 502, the live schema analyzer 405 of FIG. 4 may be initiated. The live schema analyzer 405 may open all databases, documents, and/or collections from a database such as, for example, the NoSQL database 401 of FIG. 4, as in block 504. The live schema analyzer 405 may read all documents and extract all used keys and infer data type(s) based on data and there may be more than one key because data type may change from one record to another (e.g., a key may hold a string on old records and an array on new ones), as in block 506. For example, the list of keys may be a name, address, address.lines, address.zipcode, address.state, address.city, and birthdate.

The live schema analyzer 405 may generate/create histograms for extracted keys and data type, as in block 508. That is, the histogram may be created based on key frequency. In block 510, the live schema analyzer 405 may create the schema that may include a list of all keys used on each database, document, and/or collection along with the respective data types. The schema may be inferred from the data currently available such as, for example, using the example list of keys that have been extracted (e.g., name, address, address.lines, address.zipcode, address.state, address.city, and birthdate.). For example, a field name may be the "name," the number of occurrences may be "3" and the data type may be "string." As an additional example, the field name of "address.lines" may have 2 occurrences and the data type may be an Array[string]. The operations for creation of the data schema may end, as in block 512.

Figure 6:
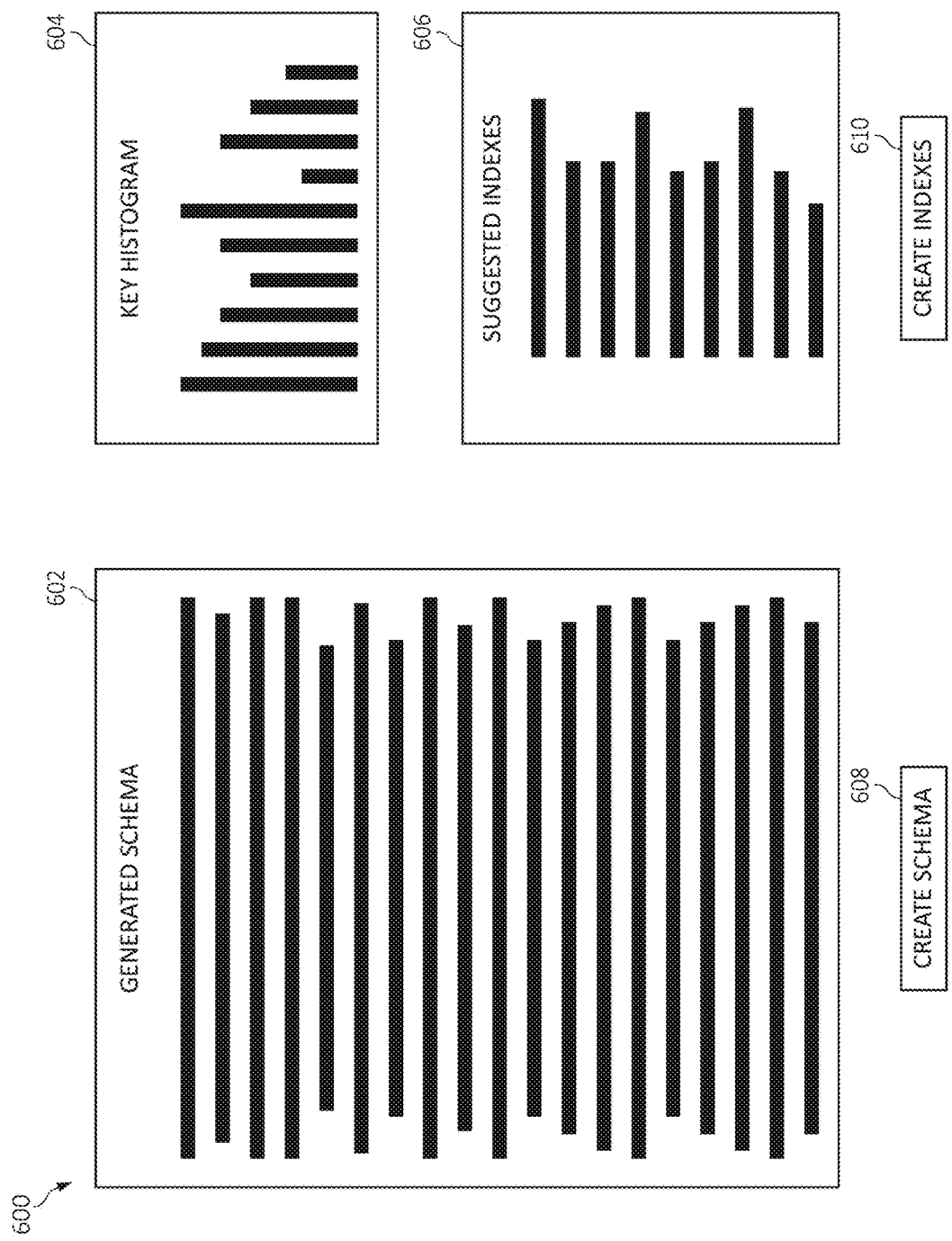
FIG. 6 is an additional block diagram depicting an exemplary user interface with schema and index creation functionality in accordance with aspects of the present invention.

In association with FIG. 5, FIG. 6 depicts a user interface 600 with schema and indexes creation functionality. That is, a create schema component 608 and create indexes component 602 may each be activated by a user to activate the live schema analyzer 405 to generate/create a schema and provide one or more indexes 610. The user interface 600 may display a key histogram 604 and one or more suggested indexes 606.

Figure 7:
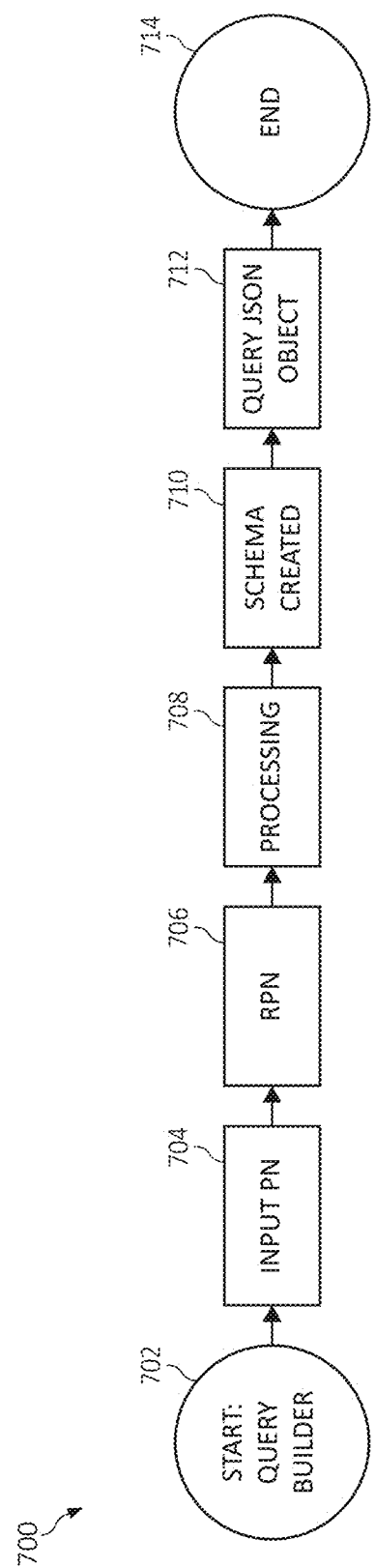
FIG. 7 is an additional block diagram depicting building a query using a data schema in accordance with aspects of the present invention.

FIG. 7 is an additional block diagram depicting building a query using a data schema. Repetitive description of like elements, components, modules, services, applications, and/or functions employed in other embodiments described herein (e.g., FIGS. 1-4) is omitted for sake of brevity.

For example, the query builder 404 of FIG. 4 and/or the computer system/server 12 of FIG. 1, incorporating processing unit 16, may be used to perform various computational, data processing and other functionality described in FIGS. 4 and 7. Also, as shown, the various blocks of functionality are depicted with arrows designating the blocks' 700 relationships with each other and to show process flow. As will be seen, many of the functional blocks may also be considered "modules" or "components" of functionality.

Figure 8:
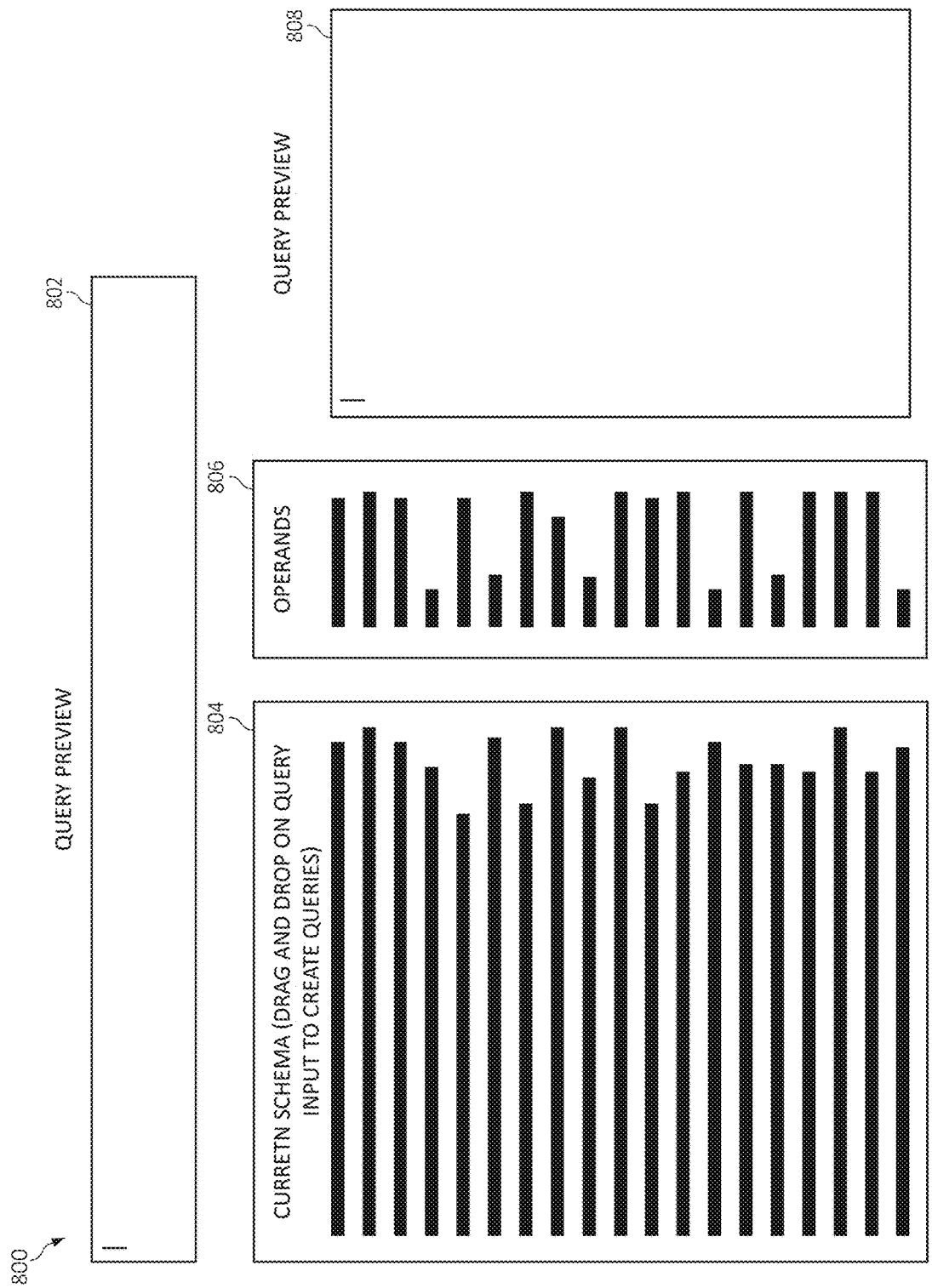
FIG. 8 is an additional block diagram depicting an exemplary user interface with query input functionality in accordance with aspects of the present invention.

Starting in block 702, the query builder 404 of FIG. 4 may be initiated. The query builder 404 may input a query using a prefix notation such as, for example, a polish notation ("PN"), as in block 704. By using the prefix notation (e.g., a reversed polish notation ("RPN")), the order of operands may determine the nesting and order of precedence while avoiding the use of parenthesis. In block 706, the query builder 404 may reverse the polish notation to start processing the query. The query builder 404 may process the query by translating the RPN into a query JSON object, as in block 708. The query builder 404 may 1) add keys used in the query to the usage rank, 2) count a number of occurrences of the query, and/or 3) sort the number of query occurrences in descendent order, as in block 710. In block 712, the query JSON Object may be returned (e.g., returned to a user via user interface as illustrated in FIG. 8). The operations for building a query may end, as in block 714.

For example, a user may input a Polish notation query (e.g., $or, #name, "John Doe", #name, "Jane Doe". The user may then receive the a JSON object for the query and the usage rank may be updated and increasing the field name usage (e.g., the field name being "name" and the usage indicating usage occurrence with the additional 2 names (e.g., "John Doe" and "Jane Doe") from the query.

In association with FIG. 7, FIG. 8 depicts a user interface 800 with query input functionality. That is, the user interface 800 provides a query input component 802. The user interface 800 may provide a current scheme 804 (e.g., drag and drop onto the query input to create one or more queries) and one or more operands 806. The user interface 800 may also provide a query preview 808.

FIG. 9 is an additional block diagram depicting optimization of a query using a data schema. Repetitive description of like elements, components, modules, services, applications, and/or functions employed in other embodiments described herein (e.g., FIGS. 1-4) is omitted for sake of brevity.

For example, the query optimizer 403 of FIG. 4 and/or the computer system/server 12 of FIG. 1, incorporating processing unit 16, may be used to perform various computational, data processing and other functionality described in FIGS. 4 and 9. It should be noted that, as shown, the various blocks of functionality are depicted with arrows designating the blocks' 900 relationships with each other and to show process flow. As will be seen, many of the functional blocks may also be considered "modules" or "components" of functionality.

Starting in block 902, the query optimizer 403 of FIG. 4 may be initiated. The query optimizer 403 may obtain a latest schema generated by the live schema analyzer 405 of FIG. 4, as in block 904. The query optimizer 403 may use the data type to suggest/auto-create one or more views and indexes for common types (e.g., fields containing date or fields with common keywords such as, for example, 'status', 'id', 'name'), as in block 904. The query optimizer 403 may obtain the usage rank generated from the query builder 404 of FIG. 4, as in block 906. The query optimizer 403 may, based on the schema and usage rank, generate one or more additional indexes and view suggestions (in addition to those generated in block 904), as in block 908. The operations for building a query may end, as in block 910.

For example, the schema may be retrieved from the live schema analyzer 405 and the usage rank may be retrieved from the query builder 404. An index and view suggestion may be generated such as, for example, 1) index by name, 2) index by birthdate, and 3) view by name and birthdate.

In association with FIG. 9, FIG. 10 depicts a user interface 1000 with query input functionality. That is, the user interface 1000 provides a generate view suggestions component 1006 and a create suggested views component 1008 that may each be activated by a user to activate the query optimizer 403 to optimization of a query using a data schema. The user interface 600 may display a key histogram 1004 and one or more suggested views 1002.

Figure 11:
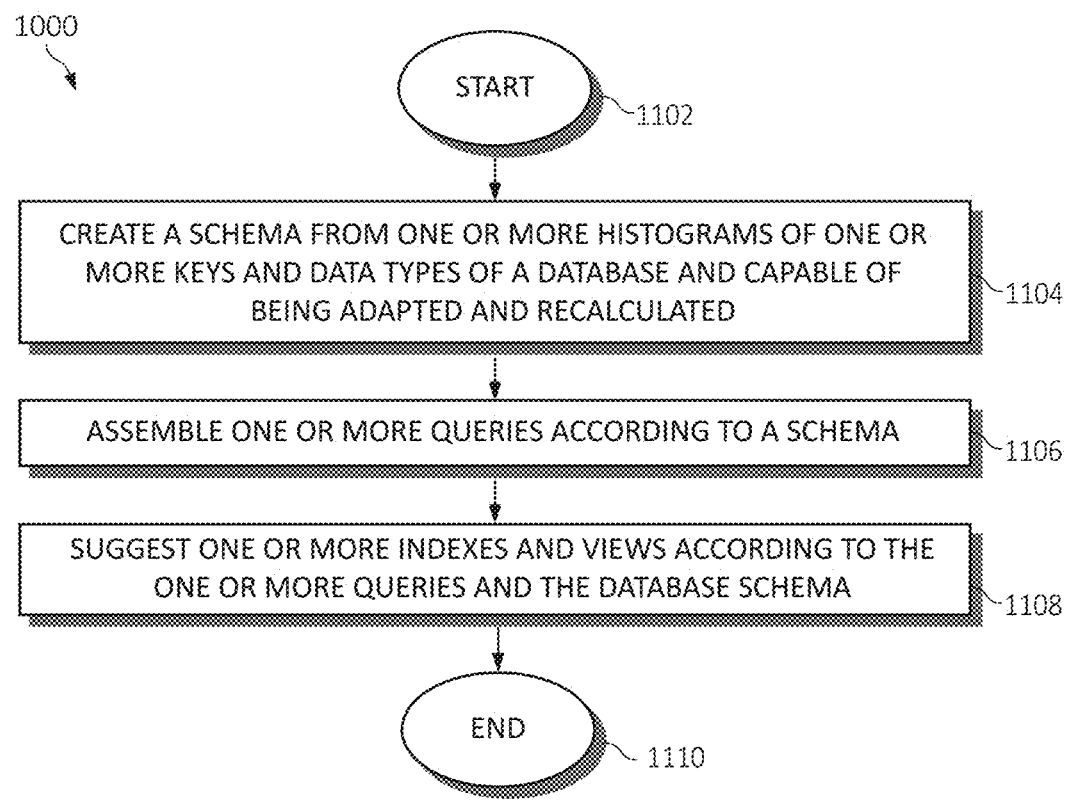
FIG. 11 is a flowchart diagram depicting an exemplary method for implementing data schema discovery and query optimization by a processor, again in which aspects of the present invention may be realized.

Turning now to FIG. 11, a method 1100 for implementing schema discovery and query optimization by a processor is depicted, in which various aspects of the illustrated embodiments may be implemented. The functionality 1100 may be implemented as a method executed as instructions on a machine, where the instructions are included on at least one computer readable medium or one non-transitory machine-readable storage medium. The functionality 1100 may start in block 1102.

A schema may be created from one or more histograms of one or more keys and data types of a database and capable of being adapted and recalculated, as 1104. One or more queries may be assembled according to a schema, 1106. One or more indexes and views may be suggested according to the one or more queries and the database schema, as in block 1108. The functionality 1100 may end, as in block 1110.

In one aspect, in conjunction with and/or as part of at least one block of FIG. 11, the operations of method 1100 may include each of the following. The operations of method 1100 may receive, from the database, one or more keys extracted from data and the data types. The operations of method 1100 may receive an input of the one or more queries using a prefix notation, reverse the prefix notation prior to processing the one or more queries, and process the one or more queries having a reversed prefix notation by translating the one or more queries into a query JavaScript Object Notation (JSON) object. The operations of method 1100 may add one or more keys used in the one or more queries to a usage rank, wherein the usage rank indicates a number of occurrences of a query. The operations of method 1100 may generate the one or more indexes and views for one or more similar data types according to a usage rank, the data types, and the schema received from a data repository.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for implementing schema discovery and query optimization by a processor, comprising:
creating a schema from one or more histograms of one or more keys and data types of a database, wherein the schema is capable of being adapted and recalculated;
assembling one or more queries according to the schema by receiving an input of the one or more queries using a prefix notation, and reversing the prefix notation prior to processing the one or more queries;
processing the one or more queries having the reversed prefix notation by translating the one or more queries into a query JavaScript Object Notation (JSON) object;
suggesting one or more indexes and views according to the one or more queries and the schema; and
generating the one or more indexes and views for one or more similar data types according to a usage rank, the data types, and the schema received from a metadata repository.

2. The method of claim 1, further including receiving, from the database, one or more keys extracted from data and the data types.

3. The method of claim 2, further including adding the one or more keys used in the one or more queries to the usage rank, wherein the usage rank indicates a number of occurrences of a query of the one or more queries.

4. A system for implementing schema discovery and query optimization, comprising:
one or more computers having one or more hardware processors in communication with one or more memory, the one or more memory storing executable instructions that when executed by the one or more hardware processors cause the one or more hardware processors to:
create a schema from one or more histograms of one or more keys and data types of a database, wherein the schema is capable of being adapted and recalculated;
assemble one or more queries according to the schema by receiving an input of the one or more queries using a prefix notation, and reversing the prefix notation prior to processing the one or more queries;
process the one or more queries having the reversed prefix notation by translating the one or more queries into a query JavaScript Object Notation (JSON) object;
suggest one or more indexes and views according to the one or more queries and the schema; and generate the one or more indexes and views for one or more similar data types according to a usage rank, the data types, and the schema received from a metadata repository.

5. The system of claim 4, wherein, when executed by the one or more hardware processors, the executable instructions further cause the one or more hardware processors to receive, from the database, one or more keys extracted from data and the data types.

6. The system of claim 5, wherein, when executed by the one or more hardware processors, the executable instructions further cause the one or more hardware processors to add the one or more keys used in the one or more queries to the usage rank, wherein the usage rank indicates a number of occurrences of a query of the one or more queries.

7. A computer program product for implementing schema discovery and query optimization by a processor, the computer program product comprising a non-transitory computer-readable storage medium having computer-readable program code portions stored therein, the computer-readable program code portions comprising:

an executable portion that creates a schema from one or more histograms of one or more keys and data types of a database, wherein the schema is capable of being adapted and recalculated;

an executable portion that assembles one or more queries according to the schema by receiving an input of the one or more queries using a prefix notation, and reversing the prefix notation prior to processing the one or more queries;

an executable portion that processes the one or more queries having the reversed prefix notation by translating the one or more queries into a query JavaScript Object Notation (JSON) object;

an executable portion that suggests one or more indexes and views according to the one or more queries and the schema; and an executable portion that generates the one or more indexes and views for one or more similar data types according to a usage rank, the data types, and the schema received from a metadata repository.

8. The computer program product of claim 7, further including an executable portion that receives, from the database, one or more keys extracted from data and the data types.

9. The computer program product of claim 8, further including an executable portion that adds the one or more keys used in the one or more queries to the usage rank, wherein the usage rank indicates a number of occurrences of a query of the one or more queries.

* * * * *